Dec. 26, 1967  E. J. BRYNER ET AL  3,360,109
BOWL FEEDER
Filed March 21, 1966

INVENTORS
JOSEPH N. IANUZZI
BY ERNEST JAMES BRYNER

Charles L. Lovercheck
attorney 3,360,109
BOWL FEEDER
Ernest James Bryner and Joseph N. Ianuzzi, Bradford, Pa., assignors to Sigma Engineering Service, Inc., Custer City, Pa., a corporation of Pennsylvania
Filed Mar. 21, 1966, Ser. No. 535,970
3 Claims. (Cl. 198—220)

ABSTRACT OF THE DISCLOSURE

The invention disclosed herein constitutes the substitution in a bowl feeder or a vibratory conveyor of bowl supporting members made of magnetostrictive material instead of the springs that are usually used.

---

This invention relates to conveyors and, more particularly, to the type of conveyors commonly known as bowl feeders.

The principle of operation of a bowl feeder is well known and is shown, for example, in Patent No. 2,609,914 to Balsiger. This patent shows a bowl feeder with a base and a bowl supported on the base by means of leaf type springs supported around the feeder in a generally cylindrical pattern. Each leaf is attached at the lower end to the base in a circular pattern and it extends upwardly to the bowl at an angle of less than ninety degrees and each spring lies in an overall path defined by the said cylindrical path. The bowl is moved up and down by means of an electrical solenoid which is energized by intermittent direct current so that when an axial force is applied to the bowl, the bowl is guided in an arcuate path and, at the same time, in an up and down path so that the bowl actually moves in a helical path and oscillates in this path. Thus, parts that are placed in the bowl are inched ahead up the track inside the bowl in a well known manner of a range of from 60 cycles per second to 100,000 cycles per second.

It has been discovered that by substituting elongated members made of magnetostrictive material for the springs, the solenoid is eliminated and, also, the bowl of the bowl feeder is moved in a more positive and definite path than when springs are used according to the prior art.

It is, accordingly, an object of the present invention to provide an improved parts feeder.

Another object of the invention is to provide an improved conveyor.

Still another object of the invention is to provide an improved driving mechanism for a bowl type feeder.

Yet another object of the invention is to provide a bowl type feeder which is supported, guided, and actuated by members having magnetostrictive properties with excursion per stroke and approximately 30 parts per million in the parts magnetostrictive material itself.

With the above and other objects in view, the present invention consists of the combination and arrangement of parts hereinafter more fully described illustrated in the accompanying drawing and more particularly pointed out in the appended claims, it being understood that changes may be made in the form, size, proportions, and minor details of construction without departing from the spirit or sacrificing any of the advantages of the invention.

Figure 1:
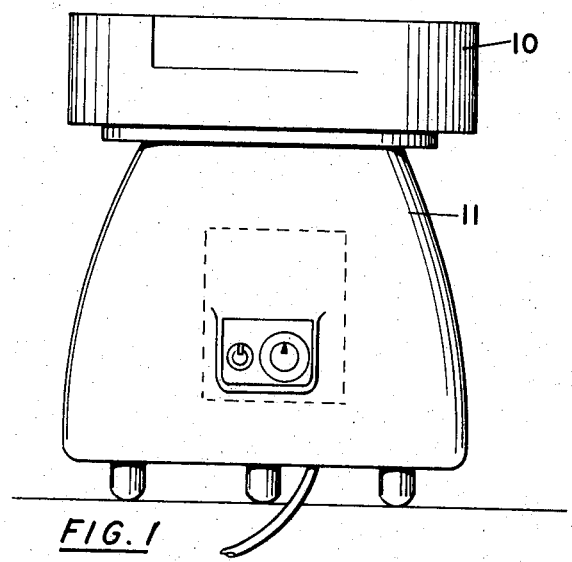
FIG. 1 is a side view of a bowl feeder according to the invention.
Figure 2:
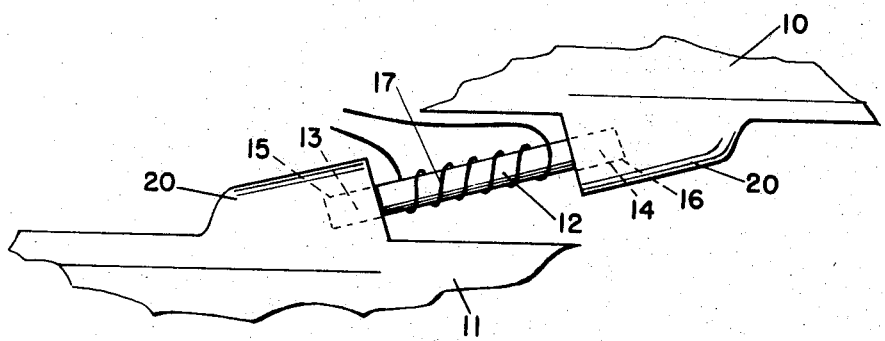
FIG. 2 is an enlarged view of the magnetostrictive elongated members which support the bowl.
Figure 3:
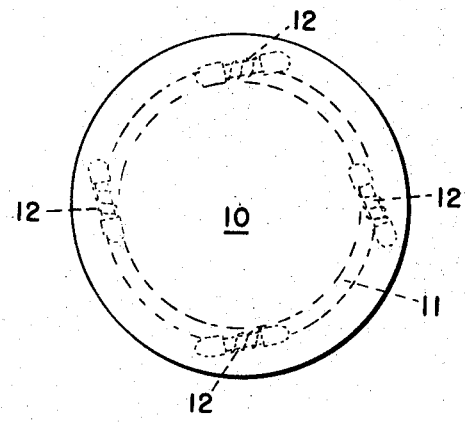
FIG. 3 is a top view of the feeder according to the invention.

Now with more particular reference to the drawing, the bowl feeder shown in FIGS. 1 and 2 is made up of a bowl 10 which may be similar to the bowl shown in Balsiger Patent No. 2,609,914. The bowl is supported on a relatively heavy base 11 which may be similar to the base supporting the feeder shown in the said patent; however, in the present application, the base need not be as heavy as that in the said patent since the same inertial problems will not be encountered in the present design.

The bowl is supported on the base 11 by means of elongated members 12 which are fixed at their lower ends 13 to the base and at their upper ends 14 to the bowl. The elongated members 12 may be fixed to the base by inserting them in a suitable bore 15 in a boss member 20 or they may be attached in any other suitable manner. They may also be fixed to the bowl 10 by inserting them in a suitable bore 16 or other suitable manner.

The elongated members 12 may be made up of cylindrical rods made of material having pronounced magnetostrictive properties; for example, they may be made of iron, nickel, cobalt, and alloys, thereof, also, certain alloys of copper, manganese, and tin, that exert appreciable magnetostrictive properties.

The rods may be energized by any suitable means. For example, a wire in the form of solenoid indicated at 17 may be wrapped around each rod and this solenoid may be energized by a suitable intermittent current, for example, by rectified alternating current in the manner suggested for the power supply in the said patent.

A solenoid or wire coil 17 is disposed around the rods 12 and may be energized by intermittent direct current so that the rods increase and decrease in length and thus impart the necessary intermittent spiral motion to the bowl. The solenoid may be either connected in series or in parallel.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A conveyor for moving articles comprising
   a generally spiral shaped track,
   means connected to said track for oscillating it in a generally arcuate path,
   said means to oscillate said track comprising an elongated member having two ends,
   one said end being attached to said track,
   the other said end of said elongated member being attached to a relatively fixed member,
   said elongated member being made of a material having magnetostrictive properties,
   said elongated members extending upwardly at an angle of less than right angles to said base,
   and means to intermittently magnetize said elongated member whereby the length thereof is intermittently increased and decreased.

2. A conveyor comprising
   a bowl having a bottom and a generally cylindrical side wall with a spiral shaped track extending around the inner periphery of said cylindrical wall,
   a base,
   elongated members made of magnetostrictive material attached to said base at one end and to said bowl at the other,
   said elongated members extending upwardly at an angle of less than right angles to said base,
   and means to apply an electromagnetic field to said elongated members.

3. The conveyor recited in claim 2 wherein said material of which said elongated members are made is taken from the group of iron, nickel, cobalt, and alloys thereof.

References Cited

UNITED STATES PATENTS

| | | | |
|---|---|---|---|
| 2,014,410 | 9/1935 | Pierce | 73—71.5 |
| 2,476,778 | 6/1949 | Smoluchowski | 310—26 |
| 2,826,396 | 3/1958 | Murdock | 310—26 |
| 2,845,168 | 7/1958 | Smith | 198—220 |

FOREIGN PATENTS 1,097,732   1/1961   Germany.

RICHARD E. AEGERTER, *Primary Examiner.*